United States Patent Office 2,794,747
Patented June 4, 1957

2,794,747
PRINTING INK VEHICLE CONTAINING A CONJUNCT COPOLYMER DRYING OIL

Herman S. Bloch, Chicago, Ill., assignor to Universal Oil Products Company, Chicago, Ill., a corporation of Delaware No Drawing. Application July 25, 1952,
Serial No. 300,973

8 Claims. (Cl. 106—28)

This application is a continuation-in-part of my copending application Serial No. 84,255, filed March 29, 1949, now abandoned.

The present invention relates to printing inks and particularly to inks of the oxidizing type containing a varnish vehicle which dries upon exposure to atmospheric oxygen to form a hard film, especially adapted for use in typographic, lithographic and intaglio printing processes. More specifically, the invention concerns a printing ink of the oxidizing type in which the conventional unsaturated fatty acid glyceride drying oil component of the varnish is replaced at least in part by a drying oil characterized as a conjunct copolymer of an olefinic hydrocarbon and an unsaturated fatty acid compound which dries upon exposure to atmospheric oxygen to form a tack-free, somewhat resinous, but flexible film.

Printing inks of the oxidizing type consist essentially of a vehicle or varnish which is usually a solution or a copolymerized mixture of a resin and a drying oil and one or more pigments suspended in the vehicle. The vehicle may also contain other components, such as a fatty acid, a wax, and usually a volatile solvent such as a petroleum naphtha, particularly if the drying oil component and/or the drying oil-resin mixture is viscous and requires a fluid diluent to enhance the flow characteristics of the printing ink composition.

One of the principal advantages in utilizing the present conjunct copolymer type drying oils in printing ink compositions is the rapid drying rate of the oil and the reduction in the set time required for the ink containing the present drying oil. The rapid initial setting time for the present printing ink composition enables the printing to proceed at an accelerated pace, since the printed sheets may be stacked together with less intermediate drying time required than in the case of paper sheets printed with the slower drying printing inks presently in use. The rapid initial set time for the present ink composition also eliminates or substantially reduces the penetration of the ink into the paper and prevents "strike through" to the underside of the printed sheet. The faster setting time for the ink reduces penetration through the paper by virtue of the fact that the ink remains in fluid state for a shorter period, reducing the time available to soak through the fibrous structure of the paper.

The printing ink composition provided in the present invention, containing a hydrocarbon-derived drying oil as a principal component of the varnish vehicle possesses a high degree of water tolerance which becomes an important and desirable characteristic in the ability of the ink to resist high pressroom humidity. This factor may be further enhanced by incorporating a petroleum wax or beeswax into the composition in amounts hereinafter specified.

One of the primary objects of this invention is to provide a superior printing ink composition of the type which dries by exposure to atmospheric oxygen, particularly for lithographic, typographic and intaglio printing processes, the improved features thereof comprising enhanced flow characteristics, faster drying time, greater rub resistance and less penetration into the paper or other surface being printed without sacrifice of tack, scratch resistance, etc., of the resulting ink.

In one of its embodiments, the present invention relates to a printing ink composition comprising a vehicle and pigment as major components thereof, said vehicle comprising a drying oil prepared by subjecting a mixture of an unsaturated non-aromatic hydrocarbon containing at least three carbon atoms per molecule and an unsaturated fatty acid drying oil compound selected from a fatty acid, a fatty acid ester and a fatty acid amide to conjunct copolymerization in the presence of an acid-acting catalyst and recovering from the resulting catalyst sludge said drying oil comprising a conjunct copolymer of said unsaturated fatty acid compound and said unsaturated hydrocarbon monomer.

A more specific embodiment of the invention relates to a printing ink composition containing from about 20 to about 70 parts by weight of a varnish vehicle comprising a conjunct copolymer of tung oil and an olefinic hydrocarbon containing at least 3 carbon atoms per molecule, formed in the presence of a hydrogen fluoride conjunct polymerization catalyst, from about 0 to about 25% by weight of a naphtha thinner, in an amount sufficient to adjust the viscosity of the composition to from about 8 to about 14 poises, measured at 25° C., from about 0.1 to about 1% by weight of a metallic drier, being the carboxylic acid salt of a metal which promotes oxidative drying, and from about 10% to about 40% by weight of a pigment.

Other embodiments of the invention relating to specific methods of compositing the printing ink ingredients, specific components of the ink and to other alternative procedures in the preparation of the varnish vehicle, etc., will be referred to in greater detail in the following further description of the invention.

One of the primary and essential components of the printing ink composition herein provided which distinguishes the product from conventional oxidative drying inks containing only unsaturated fatty acid ester drying oils, known presently to the art, and which lends its distinct properties to the ink to provide a product having distinct advantages over such fatty acid ester drying oils is a drying oil comprising essentially a mixture of the relatively high molecular weight hydrocarbon derivatives of said fatty acid esters which contain in their molecular structure polyolefinic unsaturation in which the olefinic double bonds are both in conjugated and non-conjugated relationship to each other. These drying oils, referred to herein as unsaturated conjunct copolymers, when incorporated into the varnish vehicle utilized in the preparation of the present printing ink composition, provide a printing ink composition having the above-described desired properties for printing purposes.

Unsaturated conjunct copolymers comprising the hydrocarbon-fatty acid ester copolymer drying oil component of the vehicle in the present printing ink composition are produced by a process known in the art as a conjunct polymerization reaction in which a mixture of an unsaturated non-aromatic hydrocarbon monomer containing at least three carbon atoms per molecule and an unsaturated fatty acid ester or other unsaturated fatty acid compound such as the acid itself or an amide thereof is contacted with a catalyst generally described as an acid-acting catalyst at reaction conditions suitable to effect the conjunct copolymerization reaction. During the course of the reaction, a sludge-like product forms as one of the principal products of the reaction, which contains substantially all of the catalyst initially charged to the reaction combined in the form of loosely bound addition complexes with the desired high molecular weight polyolefinic conjunct copolymers. These are recovered from the sludge by special methods of decomposing the catalyst complexes thereof in the sludge, as hereinafter described. Suitable unsaturated hydrocarbon charging stocks to the conjunct polymerization reaction comprise the mono-olefins (for example, propylene and its higher homologs), the polyolefinic hydrocarbons (such as butadienes, preferably in admixture with a suitable mono-olefin) and/or hydrocarbons containing acetylenic unsaturation, of either branched, straight or cyclic chain structure. The hydrocarbon reactants may be charged either individually or in admixture with each other.

The unsaturated drying oil fatty acid compounds utilized in the preparation of the drying oil vehicle of the present printing ink composition as a conjunct copolymer with the above olefinic monomer charging stock are those which occur either naturally as unsaturated fatty acid glycerides or as the synthetic, modified fatty acid compounds, including other esters in which the glyceride ester linkage thereof is replaced by esters of other types of alcohols, such as methanol, ethanol and homologs, a glycol, a polymeric glycol, such as a member of the polyethylene glycol series, other polyhydric alcohols, such as pentaerythritol, polyallyl alcohol, and 2,3-dimethylolpropanol, or an unsaturated alcohol, such as allyl alcohol or butenol. Included in the unsaturated fatty acid ester drying oils contemplated herein are the drying and semi-drying classes, both of which types contain olefinic unsaturation. Of these, particularly tung oil, linseed oil, dehydrated castor oil, and oiticica oil, as well as others, such as perilla oil, soy bean oil, hempseed oil, poppyseed oil, safflower oil, walnut oil, etc., are representative oils of the glyceride ester-type utilizable herein. Other glyceride oils which are considered to be non-drying, such as olive oil, cottonseed oil and cocoanut oil, may be utilized in the drying oil composition, partly as plasticizers and partly as reactants. It is also contemplated herein to utilize the fatty acids themselves or their amides as the monomer reactant, the acids being produced from the corresponding esters, such as the glycerides, for example, by hydrolysis while the amides are formed from the fatty acid ammonium salts heated to a temperature sufficient to liberate water from the ammonium salts, generally by heating to a temperature of from about 150° to about 350° C. The fatty acids may also be incorporated into the composition as the free acid in order to obtain certain desirable properties, as hereinafter described, but the quantity of free fatty acid in the printing ink composition is preferably maintained at below about 10% by weight to minimize the problem of "livering" in which the vehicle tends to separate from the pigments and other solids in the composition when the proportion of fatty acids therein becomes excessive. The fatty acids which are most suitably included either in the form of the free acid or of its amide in the conjunct copolymerization are those containing one or more olefinic double bonds per mole, and include, for example, oleic, elaidic, linoleic, palmitoleic, arachidonic, clupanodonic, eleostearic, licanic and the like, as well as their homologs and isomers.

Acid-acting or conjunct polymerization catalysts for the production of the desired polyolefinic conjunct copolymers are selected from the general class of substances referred to as Friedel-Crafts metal halides, and certain mineral acids. Of these general classes of compounds utilizable as catalysts in the reaction, anhydrous aluminum chloride and aluminum bromide as well as sulfuric acid and hydrofluoric acid containing less than about 10% by weight of water, are preferred because of their more vigorous effect in promoting the conjunct polymerization reaction. The reaction is carried out by intimately admixing the unsaturated hydrocarbon and fatty acid compound charging stocks with the catalyst at temperatures of from about −30° to about 200° C., preferably at from about 0° to about 100° C., and at pressures sufficient to maintain the reaction mixture in substantially liquid phase. The molar proportion of unsaturated hydrocarbon monomer containing at least three carbon atoms per molecule to unsaturated fatty acid compound, such as the ester or amide, charged to the conjunct copolymerization reaction is preferably maintained at from about 1:1 to about 20:1 moles per mole, depending upon the proportion of carboxylic acid groups to hydrocarbon groups desired in the ultimate conjunct copolymer product. Optimum production of the desired conjunct copolymers is obtained when the weight proportion of catalyst to organic charging stock is from about 0.5 to about 2.5, but this proportion may be varied over a considerable range outside of the preferred proportions to effect the production of the copolymers, although not necessarily with equivalent results. The products of the reaction are a sludge-phase and an upper layer saturated hydrocarbon phase, which separate upon standing, the desired sludge phase being recovered therefrom by decantation or its equivalent.

Decomposition of the sludge to effect recovery of the unsaturated conjunct copolymers therefrom may be accomplished by several alternative procedures, depending upon the catalyst utilized in the conjunct polymerization reaction. One of such methods which may be employed regardless of the particular conjunct polymerization catalyst utilized, consists of hydrolyzing the hydrocarbon-catalyst complexes contained in the sludge by thoroughly admixing the same with water, preferably maintained at a low temperature during the hydrolysis by the presence of an ice-phase in the aqueous hydrolyzing medium. During the hydrolysis, the unsaturated conjunct hydrocarbon copolymers associated with the catalyst in the sludge are released from this association and form a separate upper layer, while the water-soluble catalyst enters the lower aqueous phase.

An alternative sludge decomposition procedure, utilizable when the catalyst to the conjunct polymerization reaction is the volatile hydrogen fluoride catalyst, is by means of thermal decomposition in which the sludge is heated until the hydrogen fluoride is vaporized therefrom. A product containing a greater degree of unsaturation is obtained when the sludge is thermally decomposed in the presence of a suitable catalyst which enhances the decomposition, such as metallic particles of lead, copper, cobalt, and certain brasses containing copper, lead and tin, particles of graphitic carbon and certain metallic fluoride and oxyfluoride salts.

Another modification of the thermal decomposition method comprises introducing the hydrogen fluoride sludge into a liquid paraffinic hydrocarbon maintained at a temperature in excess of the decomposition point of the sludge, generally at temperatures of from about 50° to about 200° C. or at the boiling point of the paraffinic hydrocarbon diluent, reflux of which provides the necessary heat of decomposition to the reaction zone by contacting the reflux vapors from a suitable reboiler arrangement with the hydrogen-fluoride sludge. The desired unsaturated conjunct copolymers are subsequently recovered from the mixture of diluent and polymers by fractionation.

The mixture of unsaturated conjunct copolymers comprising hydrocarbon derivatives of the unsaturated fatty acid compound charged to the process as recovered from the sludge consists of fatty acids, fatty acid esters or fatty acid amides, depending upon the initial feed to the process, containing multiple conjugated, and non-conjugated olefinic double bonds, the product being of relatively high molecular weight and relatively non-volatile. The individual components of the mixture are believed to be cyclic, although substantially non-aromatic and have isolated unsaturation in addition to conjugated unsaturation. The product normally has a bromine number above about 90, maleic anhydride values of from about 20 to about 90, and contains from about 2.5 to about 8 double bonds per molecule, of which from about 20 to about 70% are in conjugated relationship to each other.

The resulting conjunct copolymers obtained by decomposition of the sludge have enhanced drying oil properties not only by virtue of their greater molecular weight which accounts for dried films of tougher and more elastic properties, but the conjunct copolymers are also capable of drying to a tougher, solid, non-tacky film in shorter drying periods by virture of the greater unsaturation resident in their structure, accounting for greater functionality. These copolymers provide especially desirable printing ink vehicles because of their superior drying oil properties and thus are the primary contributing factor to the superiority of the present printing ink composition over otherwise similar compositions containing merely an unsaturated fatty acid glyceride or other ester drying oil.

The printing ink vehicle may advantageously contain a resin to provide a true varnish vehicle which adds substance or body, hardness, gloss, and permanency to the film of print obtained in the printing operation utilizing the present ink composition. In the use of certain types of resin, having the properties of elasticity and/or toughness, a printed film is obtained in which these properties are also characteristic, thus providing a film which may be flexed without checking or cracking, particularly in the case of relatively thick or heavy film prints obtained, for example, by the intaglio printing process or obtained when smooth-surfaced, hard and non-absorbent surfaces are printed with the printing ink composition. Suitable resins for incorporation into the varnish vehicle include such typical classes as the natural resins, for example, rosin, copal, kauri, dammar, elemi, rubber, etc. and the various synthetic types of resins, such as phenol-formaldehyde resins, ester gum, petroleum resins, obtained as non-distillable residues of petroleum fractions, chlorinated rubber, the alkyd resins, such as the oil-modified phthalic acid-polyol condensation products, urea-formaldehyde, maleic anhydride resins, coumarone-indene resins, polyisobutylene, the terpene hydrocarbon resins, and others compatible with the drying oil component of the varnish. The presence of the hydrocarbon groups in the molecule of the drying oil fatty acid compound greatly increases the number and variety of resins utilizable in the present printing ink composition, and extends the number of resins compatible with the drying oil vehicle because of the solubilizing action of the more hydrocarbonaceous drying oil on many resins otherwise insoluble in a vehicle consisting only of a fatty acid ester drying oil. The above examples of suitable resins utilizable in the composition are merely illustrative and are not exclusive of other types of resins. The quantity of resin incorporated into the composition may be varied within wide limits, depending upon the particular resin being considered and the properties of the ultimate film desired, as well as the conditions maintained during the printing process and the type of printing process utilized. The amount of resin incorporated into the vehicle is generally within the range of from 5 to about 50%, preferably from about 4 to about 30% by weight of the finished varnish. Other ingredients which have a resinifying action upon the ultimate printed film and increase the tack of the ink, especially where black or dark-colored prints are desired, are the asphalts and asphaltenes, such as gilsonite, grahamite, pitch, the petroleum asphalts, etc., and the latter are preferably dissolved in the present drying oil varnish prior to incorporation with the other ingredients of the ink composition.

If utilized in printing ink compositions, the resin is desirably composited with the drying oil components to provide a vehicle or varnish prior to incorporation of the other ink ingredients. For this purpose, the resin in solid form, usually in small particles, or ground to a powdered form, is added gradually, with stirring, to the drying oil ingredient. The resin may also be dissolved in a naphtha solvent, for example, or in a wax or a high molecular weight alcohol, and the resulting resin-solution added to the drying oil where such additional components are desired in the ink composition for the purpose of introducing specific properties into the composition. In order to intimately dissolve and disperse the resin throughout the drying oil, the latter is heated in a conventional varnish kettle to a temperature of from about 200° to about 300° C. and the resin stirred into the drying oil at this temperature. The resulting mixing is maintained at this temperature for a period determnied by the ultimate viscosity desired, usually within the range of from about 8 to 14 poises at 25° C., although the viscosity of the unthinned varnish may be greater or less than the above-specified range, depending upon whether a naphtha solvent is to be incorporated into the printing ink. Thus, the varnish may be heated or bodied until a viscosity of from about 18 to about 20 poises or even higher viscosity is obtained, and the latter decreased by addition thereto of a naphtha diluent when the varnish has cooled. It is also to be noted that the quantity of resin incorporated into the varnish determines its viscosity, which factor is ultimately fixed by the physical properties required for the particular ink desired, for the particular use to which the ink is to be applied and the printing process in which the ink is utilized.

The present printing ink composition may optionally contain one or more pigments and toners depending upon the intended use of the ink. In the production of a black printing ink, carbon black, lamp black, and vegetable blacks are the most widely used pigments for this purpose, although organic dyes, such as Nigrosine Black and Aniline Black may be utilized to advantage either separately or in conjunction with the use of carbon black. Certain organic pigments which intensify or modify the color of another pigment in the composition, referred to as toners, may also be added to the ink composition to obtain desired coloring effects. Such toners as Induline Blue and Methyl Violet are utilized especially in printing inks in which carbon black is the primary pigment, the toner preferably being added to the composition dissolved in a fatty acid, such as oleic acid. Other pigments such as vermillion, Venetian red, chrome yellow, chrome green, lithopone, titanium dioxide, etc. may also be utilized for printing inks of specific colors. The quantity of pigment in the ink composition is generally from about 10 to about 40% by weight of the product, the higher the concentration of pigment, in general the greater the density and opacity of the printed film. Where intensity of color is not an important factor or a particular requirement of the printing ink, a class of materials known as "extenders" may be incorporated into the present printing ink composition for increasing the quantity of ink available from a given quantity of vehicle or to develop certain physical properties desired of the ink, such as body and texture. When utilized, the extender replaces a portion of the pigment component in the composition and may be selected from the relatively large group of materials known to the printing ink art for such purposes, such as kaolin, alumina, barium sulphate, magnesium carbonate, and other substances, preferably in a finely divided condition.

The present printing ink composition may also contain a so-called "drier" or "siccative" component to accelerate the oxidation-polymerization reaction involved in the drying of the printed film when it is exposed to atmospheric oxidation. These compounds which are usually in the form of metallic salts of carboxylic acids or in the form of metallic oxides reduce the drying time by substantially eliminating the induction period noted in the conversion of a pure drying oil film to a solid, resinous film, obtained when the oil is completely dried. Such driers as cobalt, nickel, manganese, cerium, and iron naphthenates, oleates, linoleates, resinates, etc., and oxides such as lead oxide, in finely powdered form dispersed in the composition or dissolved in the vehicle, are effective in the present printing ink composition in amounts of from about 0.1 to about 1% by weight thereof. The cobalt salts, such as cobalt naphthenate, constitute one of the preferred groups of drier salts in the present composition. The drier salt is preferably dissolved in the drying oil vehicle or ground together with the solid components of the composition prior to mixing all of the ingredients.

In order to enhance the dispersion of the pigment and other solid components in the vehicle and to increase the wetting action of the ink on the printed article, a wetting agent, in amounts of from about 0.05 to about 2 to 3% may be incorporated into the composition, especially in those instances where the pigment does not readily mix with the vehicle due to the inability of the drying oil to wet the pigment. Suitable wetting agents include certain carboxylic acid and sulfonic acid derivatives of organic compounds and certain metallic salts or esters thereof. The mahogany sulfonic acids, the Turkey-red oils, and certain long-chain alcohol sulfates such as lauryl sulfate, olefinic and aromatic sulfonates, such as sodium dodecyltoluene sulfonate, carboxylic acids and their salts, such as lead oleate, may be utilized, as well as naturally occurring but weaker surface-active agents such as, for example, pine oil. In general, it is preferred to mix the wetting agent with the liquid vehicle prior to mixing the pigment, toner, extender, and other solid ingredients with the vehicle.

The incorporation of various ingredients into the printing ink composition is effected by means of an efficient mixing or stirring device to intimately disperse and/or dissolve the various solid components into the vehicle previously prepared. For this purpose, various types of mixers are in present common use by printing ink manufacturers such as Buhrstone mills, colloid mills, roller mills, etc. which not only reduce the solid components to finely divided form but uniformly disperse the finely divided particles throughout the composition. During the grinding or milling operation, water may be incorporated into the printing ink composition, especially in the presence of a water-soluble wetting agent of the type hereinbefore noted. The preferred water-in-oil emulsion printing inks have water contents of from about 15 to about 50% by weight of the total composition. The preferred water-in-oil type emulsion inks are formed by dispersing the water into the previously formed vehicle pigment composition. The mixing of phases or emulsion-formation is effected during the final grinding or milling operation. The detergent or wetting agent utilized to promote the emulsification may be added either to the vehicle-pigment composition or dissolved in the aqueous phase prior to emulsification.

The following examples illustrate the preparation of printing ink vehicles containing the novel unsaturated fatty acid-hydrocarbon copolymers and the incorporation of said vehicles into specific printing ink compositions. The examples, however, are not intended to be construed as limitations of the generally broad scope of the invention herein provided.

EXAMPLE I

A drying oil vehicle, herein designated as a catalytic conjunct copolymer of tung oil and an olefin-hydrocarbon mixture (in this case an olefinic non-selective copolymer of propylene and isobutylene), was prepared by means of the following reaction. 65 parts by weight of tung oil and 185 parts by weight of the olefinic non-selective polymer having a bromine number of 162 and consisting primarily of octene to dodecylene olefinic hydrocarbons was charged into a pressure autoclave and rapidly stirred as 193 parts by weight of anhydrous hydrogen fluoride in liquid condition was added to the mixture of tung oil and polymer gasoline. The reaction mixture was vigorously stirred at 90° C. for one hour at a pressure of approximately 200 lbs./in.$^2$ to maintain the reaction mixture in liquid phase. The resulting two-phase reaction mixture was thereafter allowed to stand quiescent until a lower hydrogen fluoride sludge layer separated from a substantially saturated hydrocarbon upper layer. The lower hydrogen fluoride sludge layer, weighing approximately 351 parts by weight, was decanted from the upper hydrocarbon layer and was gradually added with stirring to a mixture of ice and water to effect the hydrolysis of the hydrogen fluoride-conjunct copolymer product. The upper phase of the hydrolytic reaction mixture was decanted and the following properties determined on the catalytic conjunct copolymer:

Molecular weight, cryoscopic _____ 644
Bromine number _____ 99
Maleic anhydride number _____ 31
Viscosity, poises _____ 1000
Analysis:
  Percent carbon _____ 82.1
  Percent hydrogen _____ 11.6
  Percent oxygen _____ 6.20

The analysis of the conjunct copolymer indicates that substantially 100% of the original tung oil introduced into the conjunct copolymerization reaction entered into the formation of the catalytic copolymer. The effectiveness of the copolymer as a drying oil is indicated by the fact that, when spread in a thin film and exposed to atmospheric oxygen, it dries dust-free in less than 12 hours and forms a hard, tough film in less than 24 hours.

A printing ink vehicle consisting of No. 0 bodied linseed oil (11 poises) was prepared as a standard for comparison with the above ink vehicle provided by the present invention. The standard vehicle is considered as representative of presently known oxidative type printing ink vehicles as now utilized in conventional printing ink compositions of the art.

EXAMPLE II

Printing ink compositions were prepared from the unsaturated conjunct copolymer drying oil vehicle described in Example I above, and the properties determined and compared with a drying oil ink composition prepared from the standard bodied linseed oil vehicle. The respective printing inks were then tested in a printing operation, utilizing a conventional printing press (Vandercook proving press) in which the printing plate (a rotating impression cylinder) containing both solid and half-tone areas was uniformly inked over its entire surface with each of the above ink compositions. The inks were printed upon several representative types of paper including (1) an English finish paper (or machine finish paper) made from sulfite pulp, the surface of which was filled with a white pigment, (2) a supercalendered paper (same as English paper finished by friction calender rolls to provide a substantially nonabsorbent paper) and (3) a coated paper containing a coating of clay casein calendered to a smooth, hard finish. Each ink was evaluated on the basis of its flow properties and compared with a formulation containing the standard vehicle (by scraping 10 grams of the ink into a mound about ½″ high on a glass plate and determining the time required to level into a pool, a leveling time of one minute indicating good flow); its tack (a qualitative test made by rubbing a small quantity of the ink into a very thin film, using the middle finger to measure the pull resistance as compared to the standard ink composition); drying qualities (printing an English finish paper with the ink composition, allowing the print to dry for 12 hours and thereafter rubbing a section of a solid printed area with the middle finger, using considerable pressure and noting the amount of ink smeared onto the white area next to the printed area); printing quality (by noting whether the ink has the ability to print a dense, black, solid film without filling in the half-tone areas on the printed paper, an inferior ink completely filling in the half-tone area to a solid film); scratch resistance (in which the back of the finger nail is slid across the half-tone areas of the sheet, the darker the line appearing on the sheet, the poorer the ink is as to scratch resistance); rub resistance (by pulling a 2" wide strip of paper under a 100 gram weight across the solid area of the print and noting the degree of burnishing on the printed film and the quantity of ink transferred to the paper strip); and penetration (by noting the degree of darkness appearing on the back side of the printed paper, especially for the absorbent type of printing paper, such as an English finish paper).

*Printing ink compositions*

The following printing ink formulations were prepared for comparative tests, utilizing the standard testing procedures hereinabove described.

Printing ink composition #1 was prepared in the following manner: the high viscosity vehicle consisting of a conjunct copolymer of tung oil and the olefinic polymer gasoline was reduced to a viscosity of 11 poises by admixing 78 grams of the catalytic copolymer vehicle with 22 grams of a petroleum naphtha solvent (Apco deodorized solvent #467) and the resulting vehicle mixed with carbon black (Peerless Brand Channel Black) by grinding 70 grams of the vehicle with 20 grams of the carbon black on a 3-roller mill. This mixture was then ground on the 3-roller mill with 5 grams of Methyl-Violet toner ink, 5 grams of Iron Blue ink, 8 grams of cobalt ink drier (cobalt naphthenate, 8% Co) and 10 grams of the naphtha solvent to reduce the viscosity to approximately 11 poises.

Printing ink composition #2 specified herein as the standard for comparison of the above printing ink composition of this invention, was prepared by admixing 70 grams of the standard vehicle consisting of No. 0 bodied linseed oil with 20 grams of carbon black and thereafter mixing the resulting carbon black-oil dispersion with 5 grams of Methyl Violet ink toner, 5 grams Iron Blue ink and 8 grams cobalt ink drier.

The following Table I is a tabulation of the results of the various testing procedures to which the above printing ink compositions were subjected:

TABLE I.—Physical Test Comparison of Ink Compositions Containing Conjunct Polymer Drying Oil Vehicles and a Composition Containing a Standard Drying Oil Vehicle

| Printing Ink Composition No. | Flow | Tack | Printing | Drying | Scratch Resistance | Rub Resistance | Penetration |
|---|---|---|---|---|---|---|---|
| 1 | ++ | + | ++ | ++ | 0 | + | ++ |
| 2 | 0 | 0 | 0 | 0 | 0 | 0 | 0 |

Code: (++) Much better than standard. (+) Better than standard. (0) Equal to standard. (−) Slightly worse than standard.

The above results of the physical tests indicate that the ink vehicle of this invention produces a printing ink composition which is superior in most properties to a standard ink composition containing the commonly used fatty acid ester drying oils exclusively.

I claim as my invention:

1. A printing ink composition comprising from 0 to about 25% by weight of a naphtha hydrocarbon thinner, from 0.1 to about 1% by weight of a drier metal in the form of a salt, from about 10 to about 40% by weight of a pigment and from about 20% to about 70% by weight of a drying oil vehicle containing the product of the conjunct copolymerization of an aliphatic olefin hydrocarbon containing at least 3 carbon atoms per molecule and an unsaturated fatty acid drying oil, said product having been prepared by conjunct copolymerization of said hydrocarbon and drying oil in the presence of an acid-acting catalyst, separation of the reaction mixture into a hydrocarbon phase and a sludge complex of the catalyst with the conjunct copolymer and decomposition of said sludge complex to liberate the conjunct copolymerization product, and said product having a bromine number above about 90 and a a maleic anhydride value of from about 20 to about 90 and containing from about 2.5 to about 8 double bonds per molecule, of which from about 20 to about 70% are in conjugated relationship to each other.

2. A printing ink composition comprising a pigment and a drying oil vehicle, said drying oil vehicle containing the product of the conjunct copolymerization of an unsaturated non-aromatic hydrocarbon containing at least 3 carbon atoms per molecule and an unsaturated fatty acid ester drying oil, said product having been prepared by conjunct copolymerization product being formed in the presence of an acid-acting catalyst, separation of the reaction mixture into a hydrocarbon phase and a sludge complex of the catalyst with the conjunct copolymer and decomposition of said sludge complex to liberate the conjunct copolymerization product, and said product having a bromine number above about 90 and a maleic anhydride value of from about 20 to about 90 and containing from about 2.5 to about 8 double bonds per molecule, of which from about 20 to about 70% are in conjugated relationship to each other.

3. The composition of claim 2 further characterized in that said unsaturated fatty acid ester drying oil is a natural glyceride oil.

4. The composition of claim 2 further characterized in that said olefin hydrocarbon is a copolymer of propylene and a butylene.

5. A printing ink composition comprising a pigment and a drying oil vehicle, said drying oil vehicle containing the product of the conjunct copolymerization of an olefinic polymer gasoline and an unsaturated fatty acid ester drying oil, said product having been prepared by conjunct copolymerization of said gasoline and drying oil in the presence of an acid-acting catalyst, separation of the reaction mixture into a hydrocarbon phase and a sludge complex of the catalyst with the conjunct copolymer and decomposition of said sludge complex to liberate the conjunct copolymerization product, and said product having a bromine number above about 90 and a maleic anhydride value of from about 20 to about 90 and containing from about 2.5 to about 8 double bonds per molecule, of which from about 20 to about 70% are in conjugated relationship to each other.

6. The composition of claim 5 further characterized in that said fatty acid ester drying oil is a natural glyceride oil.

7. The composition of claim 2 further characterized in that said fatty acid ester drying oil is tung oil.

8. The composition of claim 2 further characterized in that said fatty acid ester drying oil is linseed oil.

References Cited in the file of this patent

UNITED STATES PATENTS

| | | |
|---|---|---|
| 2,135,976 | Koenig | Nov. 8, 1938 |
| 2,151,382 | Harmon | Mar. 21, 1939 |
| 2,352,979 | Soday | July 4, 1944 |
| 2,361,740 | Boggs | Oct. 31, 1944 |
| 2,397,600 | Zerhart | Apr. 2, 1946 |
| 2,406,795 | Bernardi | Sept. 3, 1946 |
| 2,422,002 | Ewell et al. | June 10, 1947 |
| 2,468,956 | Burg | May 3, 1949 |
| 2,536,845 | Gleason | Jan. 2, 1951 |
| 2,569,383 | Leyonmark et al. | Sept. 25, 1951 |
| 2,622,987 | Ratcliffe | Dec. 23, 1952 |
| 2,640,782 | Block et al. | June 2, 1953 |

FOREIGN PATENTS

| | | |
|---|---|---|
| 362,845 | Great Britain | Dec. 7, 1931 |